(12) United States Patent
Chamberlain et al.

(10) Patent No.: US 9,007,218 B2
(45) Date of Patent: Apr. 14, 2015

(54) ANIMAL IDENTIFICATION SYSTEM AND RELATED METHOD

(76) Inventors: David Chamberlain, St. Peters (GB); Nicholas Andrew James Smith, St Sampson (GB); Helen Catherine Chamberlain, St. Peters (GB)

( * ) Notice: Subject to any disclaimer, the term of this patent is extended or adjusted under 35 U.S.C. 154(b) by 65 days.

(21) Appl. No.: 12/998,819

(22) PCT Filed: Dec. 8, 2009

(86) PCT No.: PCT/GB2009/002838
§ 371 (c)(1),
(2), (4) Date: Jun. 6, 2011

(87) PCT Pub. No.: WO2010/067058
PCT Pub. Date: Jun. 17, 2010

(65) Prior Publication Data
US 2011/0241885 A1    Oct. 6, 2011

(30) Foreign Application Priority Data
Dec. 8, 2008    (GB) .................................. 0822314.1

(51) Int. Cl.
*G08B 23/00*    (2006.01)
*A01K 11/00*    (2006.01)

(52) U.S. Cl.
CPC .................. *A01K 11/006* (2013.01)

(58) Field of Classification Search
CPC ... A01K 29/00; A01K 11/006; A01K 11/008; G06Q 10/08; G06Q 10/087; G06Q 50/02
USPC .......... 340/573.3, 573.1, 572.1, 572.7, 693.5; 119/51.02, 712
See application file for complete search history.

(56) References Cited

U.S. PATENT DOCUMENTS

| 6,342,839 | B1 * | 1/2002 | Curkendall et al. ........ 340/573.3 |
| 6,684,810 | B2 * | 2/2004 | Martin ....................... 119/51.02 |
| 2002/0116390 | A1 * | 8/2002 | Meadows ................... 707/104.1 |
| 2004/0230607 | A1 * | 11/2004 | Pawlick ..................... 707/104.1 |

FOREIGN PATENT DOCUMENTS

GB    2381180 A    *    4/2003

* cited by examiner

*Primary Examiner* — Thomas Mullen
(74) *Attorney, Agent, or Firm* — William H. Bollman

(57) ABSTRACT

A system for identifying an animal comprises an identification tag/transponder device surgically implanted into tissue of the animal and a scanning unit. As the animal passes in a vicinity of a scanning unit, the system causes the identification device to send a signal to a receiving portion of the scanning unit, and processes the signal, and identifies the animal from the signal. The system is of particular benefit to veterinary surgeries in assisting their smooth operation.

7 Claims, 4 Drawing Sheets

ANIMAL IDENTIFICATION SYSTEM AND RELATED METHOD

FIELD OF THE INVENTION

The present invention relates to a system for identifying animals and a related method of identifying animals and has particular, but not exclusive, application to veterinary and use by customs and law enforcement officers.

BACKGROUND

It is not always easy to immediately identify individual animals, in particular to establish with a high degree of confidence that a said animal is a particular individual animal or belongs to a particular person.

With the introduction of more relaxed controls at border crossings and customs offices, in relation to pets, for example. The introduction of so called "pet passports", it is important for efficiency reasons to be able to quickly identify that an animal is a particular claimed individual. Furthermore it is sometimes vital that this can be achieved with a high degree of confidence so as to minimise the risk that unauthorised animals are let into a country so as to minimise the risk of diseases, such as rabies. In certain instances, such a system may also prevent or deter against the smuggling of rare breeds or indeed stolen and highly valued stock.

Despite the use of so-called "pet passports" there remain problems faced by customs officials and veterinary staff in identifying individual animals in breeds where individuals are very difficult to identify.

BRIEF DESCRIPTION OF PRIOR ART

Electronic tagging of animals is well known in the art. For example, U.S. Pat. No. 6,297,739 (SMALL) describes an animal access system for providing access to selected animals to a secured enclosure. Each animal carries an identification device with a unique identification code. A sensor detects the presence of an animal near as door. In addition a weight sensor is located outside the door. However this system has limited application and the sensors can be tampered with.

U.S. Pat. No. 5,992,096 (DE LA CERDA et al) discloses a controllable access system which is connected to a door of a building and which includes an animal motion detector and an associated reader that detects an encoded pet tag worn by an animal. A locking mechanism is actuated in response to reading an authorised code.

A similar locking system is described in German Offenlegungsschrift DE 41 24 143 (VOLKER), in which a flap covers an entrance for a desired pet, such as a cat, and remains closed to other animals. The flap is activated by way of a magnet or micro-chip.

In addition to the aforementioned publications, US Patent Application US-A-2004/0 257 294 (Bernard and Martin) describes a loop antenna that is part of a system for tracking the movement of items, people or animals. The antenna is specially adapted to operate in a vertical plane and to define an open loop sufficiently large enough to allow people to walk therethrough.

Published US Patent Application US-A-2007/0 200 701 (English and Zuver) discloses a method of monitoring an entrance into a container, for example of the type that is transported on a cargo container. Again a loop of sufficient dimensions is described that permits a person to walk therethrough.

All the aforementioned systems are generally directed at specific systems designed for permitting authorised access of humans, objects or animals, such as a pet, into a house, container, and area of restricted access or a building. None provides any way of identifying an animal; and so would be of little use in a veterinary surgery facility.

Published International Patent Application WO-A-2005104775 (American Canine Association) discloses an Internet tracking system that enables owners to input details of animal records.

The aforementioned system can be used by a regulatory agency to monitor and trace the history of specific animals.

It is an object of the present invention to overcome the aforementioned to provide an animal identification system which is flexible, reliable and accurate.

SUMMARY OF THE INVENTION

According to a first aspect of the invention there is provided a system for identifying an animal from an identification tag/transponder device surgically implanted into tissue of said animal, comprising: a scanning unit, whereby, in use, as said animal passes in the vicinity of said scanning unit, the system detects an identity signal from the identification tag/transponder by the scanning unit; a means to process said identity signal so as to derive an animal identification signal; characterised in that a comparison means is configured to compare data stored on at least one database with said animal identification signal so as to identify the animal.

Ideally the system sends the animal identification signal to more than one database in an encrypted form. The, or each, database may be on a local area network or dispersed more widely, for example in one or more countries.

The reason why several databases are contacted is because often owners of pets register their details with a database proprietor as a consequence of having their animal or pet fitted with an RF identity tag.

Advantageously the scanning unit is a hand held scanner that has a data storage capability and a communication device that enables wireless communication with at least one database. An advantage of this arrangement is that whilst scanning pets and animals, with the hand held device, the user is informed of up-to-the-minute news of lost or stolen pets, thereby improving the chances of reuniting pets with their owners. Another advantage is that, use of a hand held device provides a level of flexibility and mobility for the operator, rather than requiring the animal to pass through a relatively static loop in a room or doorway.

The system preferably includes a secure means to access stored data associated with the particular identified animal and to compare the signal with an associated animal passport or identity card reference.

Stored data is ideally stored on the database, typically in the form of encoded data that links the name and address of the owners and the unique identity code stored on the identification tag/transponder device. This is either achieved using specialised software or a Look-Up table.

Other information that may be included is the identity of the animal, the name, age and sex of the animal, as well as other data such as medical history data, previous inoculations, vaccinations, therapy, medications, etc.

There is likewise the ability to include data relating to the name, address, telephone number and credit card details of the owner of the animal.

The identification tag/transponder device, that is implanted subcutaneously in the animal, may be either a passive or active transponder. Alternatively it may include a radio frequency device or an electro-magnetic transponder.

According to a second aspect of the invention there is provided a system for identifying an animal, comprising: an identification tag/transponder device surgically implanted into tissue of said animal and a hand held scanning unit, whereby, in use, as said scanning unit animal passes in the vicinity of said animal, the system causes the identification device to send an identity signal to a receiving portion of said scanning unit; a means to process said signal so as to derive an animal identification signal; characterised in that a comparison means is configured to compare data stored on a memory device in said scanning unit, said data is supplied from at least one database.

Preferably the scanning device receives data from at least one database by way of a wireless connection, such as Wi-Fi or BLUETOOTH (Trade Mark).

The invention may be implemented covertly, for example at airports or other ports, whereby criminals or other unauthorised persons attempting to steal or smuggle animals, such as dogs or horses, can be detected.

The invention also includes a method of identifying an animal comprising the steps of: implanting surgically a tag/transponder identification device into tissue of said animal and using a scanning unit to scan said animal as it passes in the vicinity of a scanning unit; receiving a signal from said identification device; comparing the signal with data stored on one or more databases so as to identify the animal and updating the device with data corresponding to lost or stolen animals.

Preferably the scanning device is updated from one or more remote databases automatically, for example by way of a wireless connection, an at regular intervals, by uploading data onto a memory on the hand held device.

It will be appreciated that the method of identifying an animal may include one or more of the preferred features associated with the aforementioned apparatus.

BRIEF DESCRIPTION OF DRAWINGS

The invention will now be described, by way of example only, and with reference to the following Figures, in which.

DETAILED DESCRIPTION OF PREFERRED EMBODIMENTS OF THE INVENTION

Figure 1:
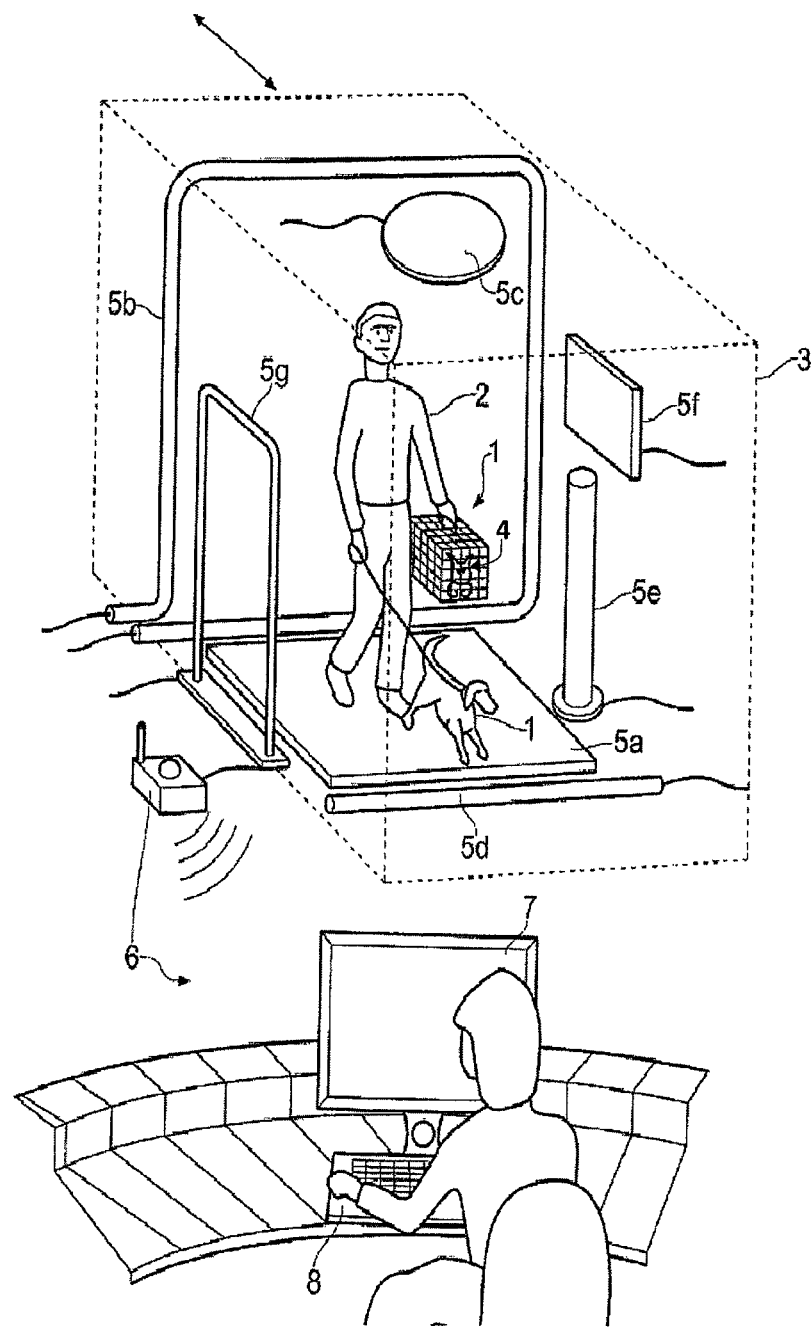
FIG. 1 shows an example of a system for identifying an animal including a walk through loop.

FIG. 1 shows schematically a system 10 for identifying an animal. There is shown a pet dog and a pet carrier 1, with its owner 2, passing through a walk-through zone 3. Implanted subcutaneously in the dog is an RF identification (RFID) tag 4.

A scanning device comprising a mat device 5a is shown, which sends out an RF signal and receives a signal back from RFID tag 4. This received signal is modulated with a unique code, individual to the RFID tag (hence the animal is uniquely identified) and this code is received by a receiver, checked and stored in an electronic format.

The receiver is connected to a data management system 6 which includes a local database, whereby each RFID tag is associated with other data such as the name of the animal and data specific to the animal as well as other pertinent information which is particular to the owner of the animal.

The system 10 includes a display or screen 7 and man-machine interface, such as a keyboard 8, which allows details of the animal and associated stored data, such as the animal's name, name and address of the owner and any other pertinent veterinary notes, to be accessed, retrieved and displayed, as the animal and owner enter a veterinary surgery facility.

Such a system that is arranged to identify animals can be used for example in a veterinary practice management system so that an animal and clients' details are immediately available to a receptionist at a veterinary reception area. This allows the receptionist to welcome the animal and client to the surgery area without having to ask the client for any information, thus providing a professional welcome service and reassuring the owner of the pet. If the animal has been booked in for an appointment then the system automatically recognises the animal's arrival, logs its appointment and displays this information to the receptionist and healthcare professional that an appointment has been booked.

In another embodiment the medical file for the particular animal is displayed on a screen. This may be sent simultaneously to a display, PC or laptop computer of the healthcare professional and/or a paper printout obtained.

Radio Frequency Identification (RFID) tags (transponders as they are also known) are well known in the art and typically comprise a micro-chip which enables RF scanning signals to be uniquely modulated. RFID tags typically include planar antennas (not shown), which are used to obtain a small amount of energy, for example from an RF illuminating source, and which RFID tags use this energy in order to power on-board components.

FIG. 1 also shows alternatives to a mat scanner, which may be used in addition to, or instead of, the mat configuration. These alternative scanners include such devices as: a loop scanner 5b, a ceiling scanner 5c, a linear cable scanner 5d, a column scanner 5e, a wall mounted scanner 5f, a side loop scanner 5g and an arched scanner (not shown).

Other types of scanning/tag combinations are well known in the art and may be used as alternatives. Instead of an RF ID tag, it will be appreciated that inductive tags, capacitive tags, magnetic tags/transponders and scanners can also be used.

In addition, although the transponders described so far are passive transponders; they may alternatively be active transponders. This is to say they may be adapted to transmit their identification signals actively to the scanner and the scanner merely comprises a receiving device.

Such active devices require their own power which is preferably supplied by kinetic batteries, whose movement, by virtue of movement of the animal, recharges electrical storage devices.

The tags are surgically implanted preferably subcutaneously using a conventional implanting tool. This has the advantage of minimising the chances of them being tampered with or changed easily. Light or infrared transponders would not work in such embodiments. Likewise exiting animal RFID tags (such as those worn by beef cows).

The invention also facilitates communication with agencies responsible for animal registration. This enables stolen animals to be immediately identified in situations where scanners are positioned around doorways or entrances to shopping malls, airports or other public buildings. An example of such a distributed system 10 is described with reference to FIG. 2 below.

It will be appreciated that the invention can be used in various applications and by various parties including: customs and excise and border controllers; as well as animal welfare organisations, boarding kennels, grooming parlours, animal rehabilitation units, police and law enforcement officers and zoos. In addition the system 10 may be modified for use in identifying wild animals in their natural environment using "runs" or "dens".

In certain applications however, a group of animals may be fitted with operationally identical identification RF ID devices 4 so that any individual of a predetermined group can be identified as coming from that group. For example, a herd of cattle belonging to a particular group passing a particular point, e.g. in a market, may all be fitted with operationally identical devices, to identify them to a particular herd/owner. In this application it is not necessary to uniquely identify particular animals and is cheaper.

Figure 2:
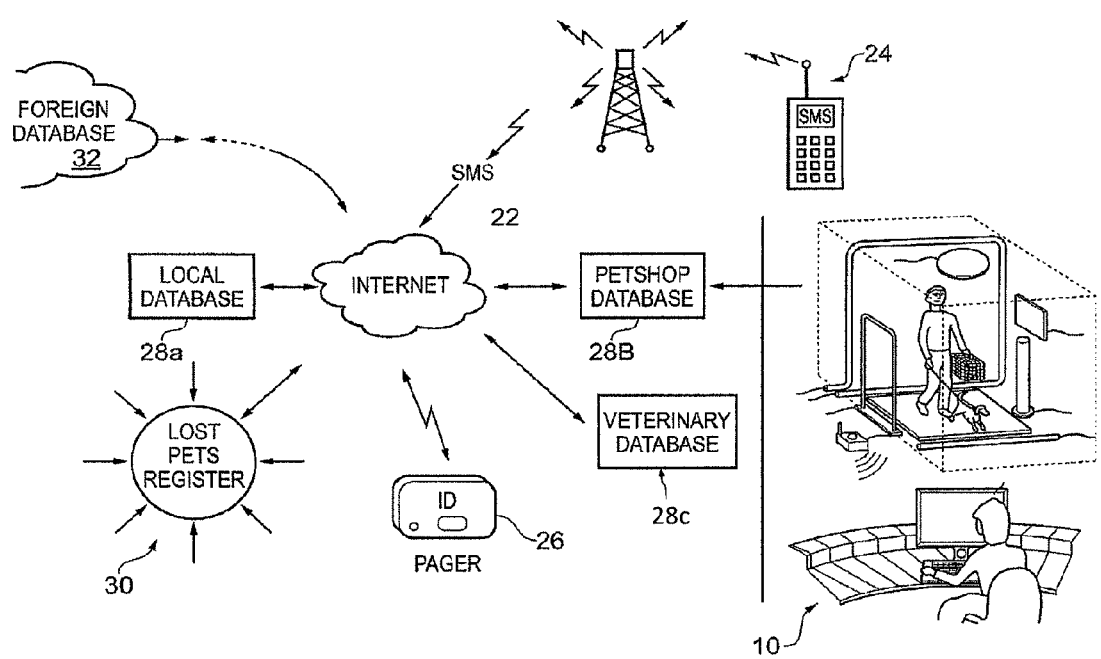
FIG. 2 is a diagrammatical view of a system arranged to scan an animal and including communication means to access different databases.

Referring to FIG. 2, which shows a system 10, of the type described above with reference to FIG. 1. The system 10 is interconnected by way of Internet and/or telephone connections 22. In addition a facility exists to enable a mobile communication device, such as a mobile telephone 24 (cellphone) or a pager 26, to be contacted or make contact with a local database 28a. Details of a lost or stolen pet are typically logged on a petshop database 28b, which might be immediately accessible and updated by the police or a local authorised user. In addition data as to identity of lost/stolen pets may emanate from a lost pets register 30 or foreign database 32.

The system 10 is normally arranged to be used or set up so as to uniquely identify a particular animal and details of such an animal may be obtained by a particular database 28a, 28b, 30, 32 transmitting those details to a central host for local storage thereon or by separate comparison at one or more remote databases. The former type of system is hereinafter referred to as a centralised system; whereas the latter type of system is hereinafter referred to as a dispersed system.

There is often a need to maintain anonymity of a pet owner's personal data; sometimes this has to be done in order to comply with local data protection regulations or sometimes it is because an owner wishes to maintain anonymity. However, there is a risk of a paradox occurring as one of the purposes of RFID chips in animals is so as to be able to reunite an owner and a pet in the event that the pet is recovered after having been lost or is stolen. In such circumstances it would not make sense to hold data in such a way that it was not possible to contact the owner and reunite the owner with a pet once found.

Accordingly the present system is configured so as to be able to achieve this by storing details of lost or stolen animals on a local, portable database such as may be incorporated into a dongle and in communication with one or more remote databases. The remote databases may be managed by a veterinary surgery facility or at a pet shop or a database might be an on-line database, accessible only via the Internet. The advantage of this arrangement is many fold.

The comparison step is performed by receiving the ID signal from the device, processing this and comparing it with a local or central database where the ID characteristics are stored with associated data, such as for example the name or identity of the database from where the original notification originated, so that owners can quickly inform as many potential scanning centres as possible.

Such a service could be for example supported by insurance companies or associations, for example in the UK, the Kennel Club, which is the name of the organisation responsible for the overseeing of various aspects of dog breeding.

Figure 3:
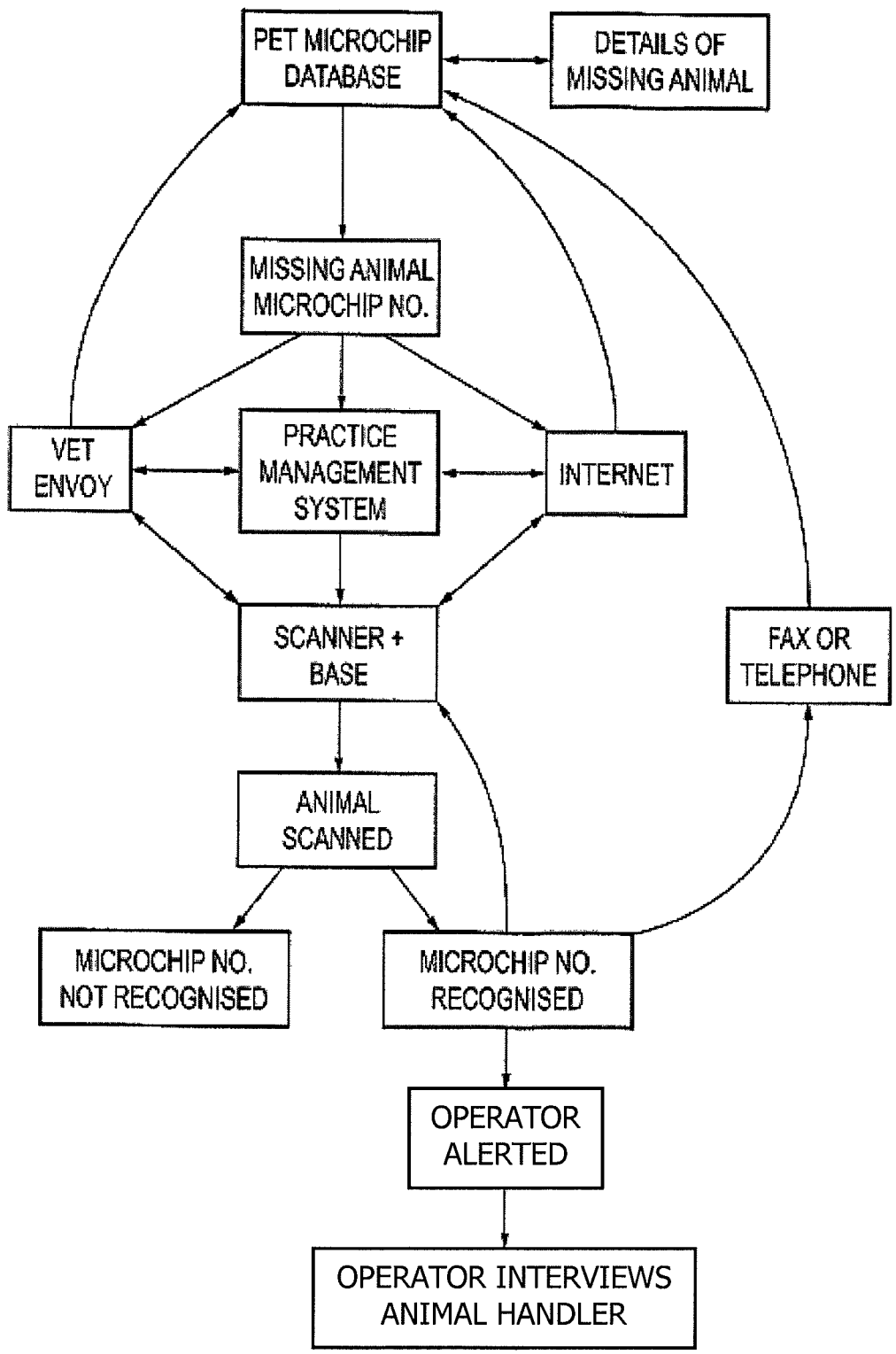
FIG. 3 is a flow diagram showing key stages in operation of the system of FIG. 2.

FIG. 3 is a flow diagram showing key stages in operation of the system of FIG. 2. Details of missing animals are communicated either directly or via the Internet, so enabling lost and/or stolen 'micro-chipped' animals to be immediately identified when they are "scanned" by a veterinary surgeon or at a customs/border control or animal welfare organisation. As shown, a missing animal microchip number is reported to a veterinary envoy, a veterinary practice management system, and a pet microchip database, via the Internet.

Figure 4:
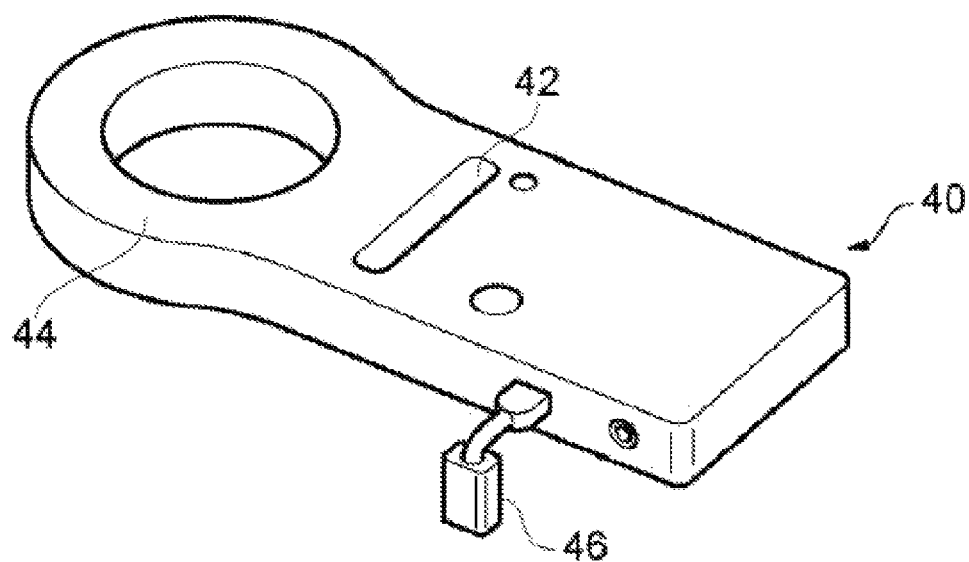
FIG. 4 shows a view of an alternative embodiment of a scanner for use in the system.

FIG. 4 is a view of an alternative embodiment of a scanner for use in the system. The scanner comprises two components: an indicator unit 50 which is capable of connecting to a scanner 40, using current commercial components, and indicates if a scanned signal is indicative of a lost or stolen animal; and the indicator unit 50, show in FIG. 5, that downloads a list of microchip numbers of stolen and/or missing animals from databases. These numbers are transferred electronically over the Internet at regular intervals.

Referring to the Figures in greater detail, FIG. 4 is an overall, diagrammatical view of a hand held scanner 40, showing a housing in which a power supply (not shown) and driver electronics are housed. Hand held scanner 40 includes a display 42 and a scanner head 44, which is in the form of a loop device.

The hand held scanner 40 is able to be connected to a database, or the Internet as shown in FIG. 2 and receive updated information as to the identity of lost and stolen pets, for example via a USB port 46.

Figure 5:
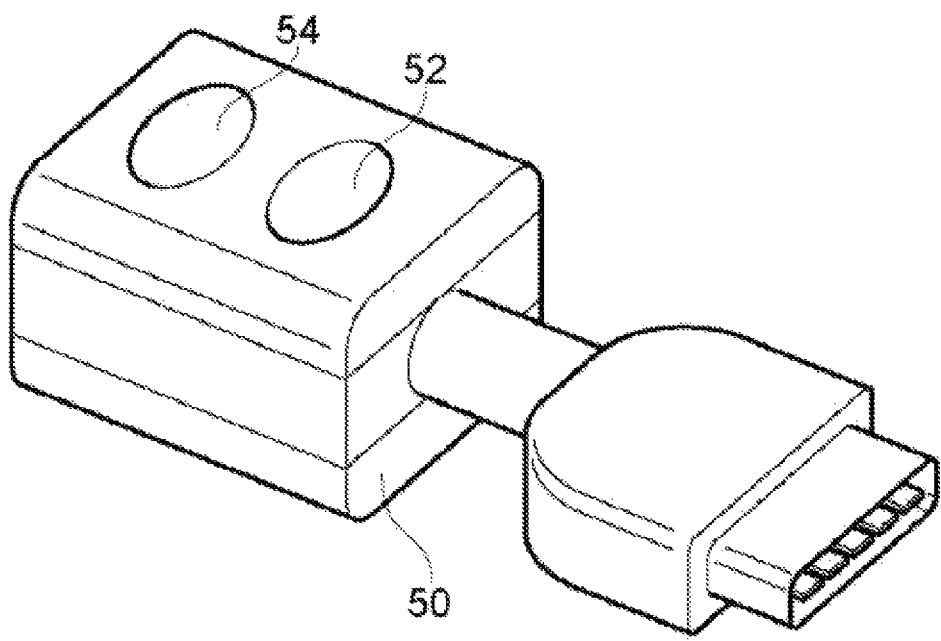
FIG. 5 shows an overall view of an indicator unit.

FIG. 5 shows an overall view of an indicator unit 50 which is in the form of a plug in dongle with a BLUETOOTH (Trade Mark), Wi-Fi or other remote data communication medium, so that a list of names, numbers and other data can be uploaded onto the handheld scanning device 40.

In view of the fact that data concerning lost or stolen animals can be uploaded almost instantaneously once it is placed on a database and distributed to remote units (e.g., pager 26), via the Internet, it is apparent that the hand held device 40 greatly improves the chances of a lost or stolen animal being repatriated with its owner by simplifying the identification process.

Indicator unit 50 can connect to current commercial microchip scanners and be used to "read" microchips implanted in an animal. The indicator unit 50 attaches to a USB or RS232 port on the scanner 40. When the scanner 40 is activated it activates the indicator unit 50 (ideally powered by a rechargeable battery) and a green light 54 illuminates to indicate that it is functioning. As the scanner 40 "reads" animals' implanted microchip numbers, the scanner 40 compares this unique identification number with an up-to-date list of microchip numbers of missing or stolen animals stored on a dynamic memory (not shown) in indicator unit 50.

If the scanned number is not the same as any in the list within the indicator unit 50 the light 54 remains green. If however, the scanned number is the same as one of the numbers on the list the green light is replaced by a red light 52.

Optionally the indicator 50 can be connected to a USB or RS232 port by a short length of cable which enables the scanner 40 to be connected to ports with awkward access.

The lists of numbers stored within the device are updated at regular intervals; the new list being written over the old list. The new list is uploaded onto the device from an Internet connection.

The indicator 50 could also store information "read" by the scanner that could later be downloaded onto a storage system and subsequently shared with other devices. In this way physiological data measured at various times could be recorded and stored for subsequent use. This information could be used to assist clinical diagnosis or assessments of pathological processes.

An example is the plotting of "glucose curves" in the assessment and control of diabetes mellitus. Tissue fluid glucose measurements may be recorded at certain time periods onto the indicator after insulin injection. After the assessment period, usually hourly recordings, typically over 12 or 24 hours, measurements may be downloaded and represented graphically. A similar process could be used for other biological parameters measured by a scanner over a period of time. To assist with the measurement of biological parameters in this way the hand held indicator 40 incorporates a clock or stopwatch so that the relative or absolute timing of measurements may also be stored.

While it is envisaged that the main embodiment of this device will be used to identify stolen or missing animals this is not its exclusive use and it could be used in other applications to assist with the identification of specific unique numbers in RFID devices.

However, in an alternative embodiment, the ID signal from the device may be processed and compared in other ways. The ID code in an alternative embodiment for use in e.g. customs is simply compared to the ID code printed on a pet passport. A printer may be configured to achieve this under control of the computer.

The invention has been described by way of examples only and it will be appreciated that variation may be made to the aforementioned embodiments without departing form the scope of the invention.

The invention claimed is:

1. A method of identifying an animal from an identification tag/transponder device surgically implanted in the animal's tissue, using at least one database and at least one hand-held scanning unit each having a memory device, an on-board power supply and an indicator, the method comprising:

automatically updating, from at least one database, at least one hand-held scanning unit with identity characteristics of a plurality of tag/transponder devices each implanted in a respective animal, storing said identity characteristics in a respective memory device of each of the at least one hand-held scanning unit, scanning a given animal with one of the at least one hand-held scanning unit and receiving a signal from one of the plurality of tag/transponder devices implanted in the given animal, comparing the signal from the one of the plurality of tag/transponder devices with the identity characteristics stored in the respective memory device of the one of the at least one hand-held scanning unit, and indicating that the signal from one of the plurality of tag/transponder devices is recognized with a match to identity characteristics.

2. A method as claimed in claim 1, wherein the automatic updating comprises:

downloading from the at least one database at regular intervals.

3. A method as claimed in claim 1, wherein:

the one of the at least one hand-held scanning unit receives data from the at least one database by way of a wireless connection.

4. A method as claimed in claim 2, wherein:

the one of the at least one hand-held scanning unit receives data from the at least one database by way of a wireless connection.

5. A method as claimed in claim 1, wherein the memory device comprises:

a database contained within the hand-held scanning unit.

6. A method as claimed in claim 1, wherein the memory device comprises:

dynamic memory.

7. A method as claimed in claim 1, wherein:

the automatic updating is conducted from a plurality of external databases external to the hand-held scanning unit.

* * * * *